(12) United States Patent  (10) Patent No.: US 8,172,164 B2
Russell et al.  (45) Date of Patent: May 8, 2012

(54) METHOD AND APPARATUS FOR A FEED INTO A GASIFIER UTILIZING A SLURRY

(75) Inventors: Steven Craig Russell, Houston, TX (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/394,626

(22) Filed: Feb. 27, 2009

(65) Prior Publication Data

US 2010/0219271 A1 Sep. 2, 2010

(51) Int. Cl.
*B02C 19/00* (2006.01)
(52) U.S. Cl. .............................. 241/19; 241/21; 241/79.1
(58) Field of Classification Search .................. 241/79.1, 241/19, 101.2, 21
See application file for complete search history.

(56) References Cited

U.S. PATENT DOCUMENTS

| 3,460,925 A | * | 8/1969 | Mitchell, Jr. .................... 48/216 |
| 4,199,327 A | * | 4/1980 | Hempill et al. ................. 48/202 |
| 5,953,899 A | | 9/1999 | Rao et al. |

* cited by examiner

*Primary Examiner* — Mark Rosenbaum
(74) *Attorney, Agent, or Firm* — Cantor Colburn LLP

(57) ABSTRACT

Disclosed is a feed system for a gasifier including a grinding mechanism capable of grinding a feedstock into particles of desired particle sizes. The particle sizes include solids particles larger than a first threshold size and raw fines particles smaller than a second threshold size. At least one solids separation device is capable of separating the solids particles from the fines particles and at least one solids conduit conveys the solids particles to a gasification plant while the fines particles are also conveyed to the gasification plant. Further disclosed is a method for feeding stock into a gasifier including conveying a feedstock into a grinding mechanism and grinding the feedstock into particles of desired sizes. Solids particles larger than a first threshold size are separated from fines particles smaller than a second threshold size and the solids particles and the fines particles are conveyed toward the gasification plant.

19 Claims, 3 Drawing Sheets

METHOD AND APPARATUS FOR A FEED INTO A GASIFIER UTILIZING A SLURRY

BACKGROUND OF THE INVENTION

The subject invention relates generally to gasification systems and processes, such as those used in Integrated Gasification Combined Cycle (IGCC) power generation. More particularly, the subject invention relates to fuel feed apparatus and methods for a gasification system.

Gasification is a process for the production of power, chemicals, and industrial gases from carbonaceous or hydrocarbon feedstocks such as coal, heavy oil, and petroleum coke. Gasification converts carbonaceous or hydrocarbon feedstocks into synthesis gas, also known as syngas, comprising primarily hydrogen and carbon monoxide. The resultant syngas is a feedstock for making useful organic compounds or can be used as a clean fuel to produce power.

In a typical gasification plant having a dry solids feed system, the feedstock, such as coal, is introduced to a grinder where it is ground into solids particles of a predetermined size. While the grinding process produces solids particles of the predetermined size, a quantity of smaller particles, known as fines, are also produced by the grinding operation. Before feeding the solids and fines into the gasifier, the solids and fines are typically dried to eliminate surface moisture for reliable flow and increase efficiency of the gasification process. Smaller particles in the feed stream such as fines, however, are capable of collecting large amounts of surface moisture thereby increasing the amount of drying required to maintain reliable flow. Further, the low mass of the fines particles reduces the feed rate capability when gravity fed from a hopper and when feeding into other equipment upstream of the gasifier. Also, a high fines content in the feed stream increases the potential for effluent emissions from the gasification process and the potential for dust explosions when stored and handled upstream of the gasifier.

BRIEF DESCRIPTION OF THE INVENTION

According to one aspect of the invention, a feed system for a gasifier includes a grinding mechanism capable of grinding a feedstock into particles of desired particle sizes. The particle sizes include solids particles larger than a first threshold size and fines particles smaller than a second threshold size. At least one cyclone is in flow communication with the grinding mechanism and is capable of separating the solids particles from the fines particles and at least one solids conduit conveys the solids particles to a gasification chamber. At least one slurry tank, wherein the fines are added to a slurry, is in flow communication with the at least one cyclone. At least one slurry conduit is disposed in flow communication with the at least one slurry tank for conveying the slurry to the gasification chamber.

According to another aspect of the invention, a method for feeding stock into a gasifier includes conveying a feedstock into a grinding mechanism and grinding the feedstock into particles of desired sizes in the grinding mechanism. Solids particles larger than a first threshold size are separated from fines particles smaller than a second threshold size. The solids particles are conveyed toward a gasification chamber and the fines particles are conveyed toward a slurry tank. The fines particles are mixed with one or more additives in the slurry tank to produce a slurry mixture, and the slurry mixture is conveyed toward the gasification chamber.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
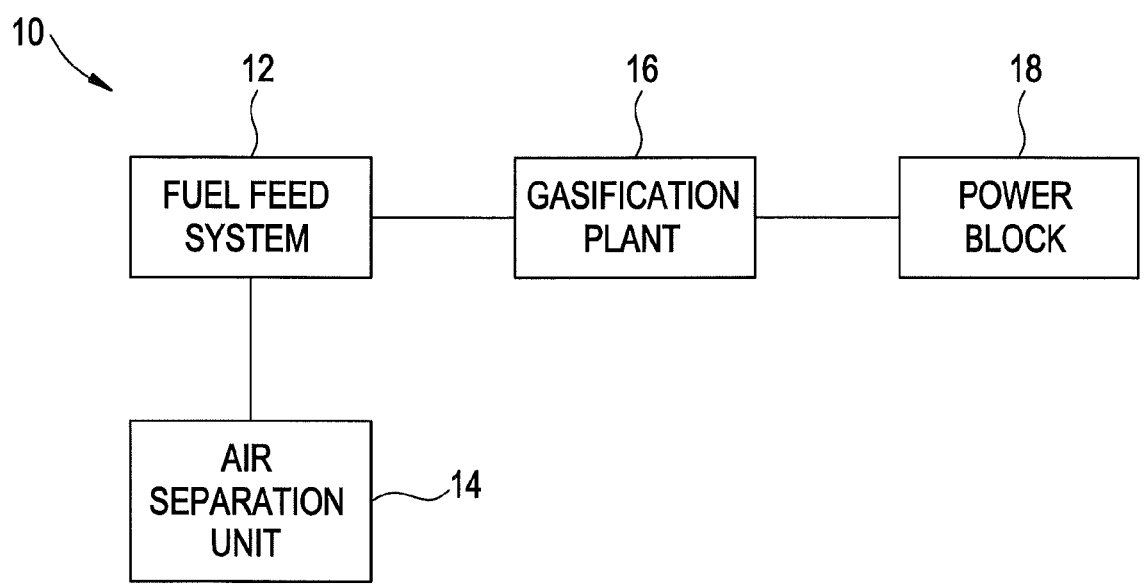
FIG. 1 is a schematic of an embodiment of a gasifier.

Shown in FIG. 1 is a block diagram of a portion of an embodiment of an Integrated Gasification Combined Cycle (IGCC) power generation plant 10. In the embodiment, plant 10 includes a fuel feed system 12 an air separation unit 14 coupled in flow communication with the fuel feed system 12. A gasification plant 16 is coupled in flow communication with the fuel feed system 12 and a power block 18. During operation, the air separation unit 14 uses compressed air to provide oxygen for use by the gasification plant 16. In an embodiment, the gasification plant 16 converts fuel and oxygen into a clean fuel gas, or syngas, that is combusted in power block 18 to produce electrical power.

Figure 2:
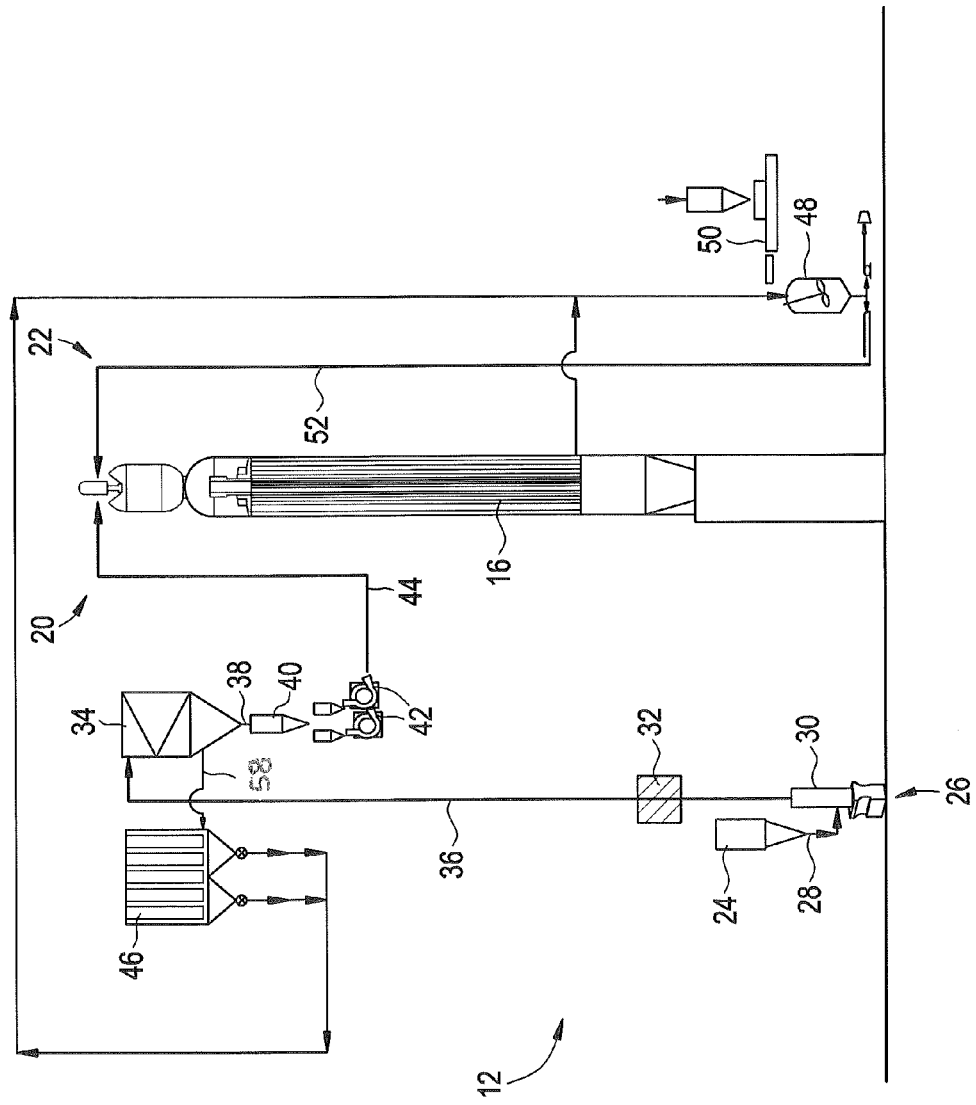
FIG. 2 is a schematic of an embodiment of a feed system for a gasifier.

In some embodiments, as shown in FIG. 2, the fuel feed system 12 is a hybrid system that includes a dry solids feed stream 20 and a fines feed stream such as a slurry feed stream 22. The dry solids feed stream 20 includes storage, for example a storage hopper 24, for a solid carbonaceous fuel, which in an embodiment is coal. Alternatively, the fuel may be a petroleum coke, a biomass, or any other solid carbonaceous fuel that will allow the plant 10 to operate as described herein. The storage hopper 24 is connected to a feed preparation section 26 via a feed conduit 28. The feed preparation section 26 includes a pulverizer 30 or other grinding mechanism into which the fuel is fed from the storage hopper 24 via the feed conduit 28. The fuel is ground in the pulverizer 30 to a collection of particles including those of a desired size. The particles are dried by, for example, forcing hot gas across the particles. The drying may occur in the pulverizer 30, or in some embodiments, a separate particle dryer 32. Drying the fuel removes a desired amount of surface moisture from all of the various particle sizes to make subsequent handling of the particles easier and more efficient by preventing conditions such as clumping, arching and rat holing of the particles.

At least one cyclone 34 is located downstream of the pulverizer 30 in the feed preparation section 26. The ground fuel particles are conveyed from the pulverizer 30 to the at least one cyclone 34 via a cyclone conduit 36. In one embodiment, the particles are conveyed by a flow of low pressure nitrogen urged through the cyclone conduit 36. As an alternative to low pressure nitrogen, any suitable gas that allows for safe and reliable conveyance of the fuel may be utilized. The at least one cyclone 34 separates the fuel particles by size, for example, those greater than 100 microns in diameter from those less than 100 microns in diameter. The 100 micron particle size is merely recited herein as an example, and is not meant to be limiting, and it is to be appreciated that other particle sizes may be desired depending on the application.

The particles of larger sizes, also known as solids, which in some embodiments are equivalent to about 90% of the material in the cyclone 34, are conveyed from the cyclone 34 via a solids conduit 38 to a ground solids storage hopper 40. The solids are then conveyed to a region of high pressure through one or more pressurization devices such as one or more solids pumps 42, and in some embodiments by a heated gas such as high pressure carbon dioxide, through an injection conduit 44 toward the gasification plant 16.

The slurry feed stream 22 includes at least one baghouse 46. The smaller particles, or fines, which have been separated from the solids in the cyclone 34, are conveyed to the at least one baghouse 46 for storage via at least one fines conduit 58. When desired, the fines are conveyed from the at least one baghouse 46 to a slurry tank 48. In the slurry tank 48, various slag additives, for example, mineral additives, and/or fluxant streams may be added to the fines via one or more additive conduits 50 to form a slurry. The slurry is typically a dilute aqueous solution of the fines, additives, and water. The slurry is then conveyed toward the gasification plant 16 via a slurry conduit 52.

In some embodiments, recycle fines, particles which are unconverted carbon fuel from the gasification plant 16, are conveyed from the gasification plant 16 to the slurry tank 48. The recycle fines are mixed with the slurry in the slurry tank 48 to be conveyed to the gasification plant 16. While in the embodiment shown in FIG. 2, the recycle fines are added to the same slurry tank 48 as the fines, the recycle fines may be conveyed to a separate slurry tank 48, added to a slurry and conveyed to the gasification plant 16 via a separate slurry conduit 52.

The slurry including the fines and/or recycle fines and the solids are introduced to the gasification plant 16 for processing after being conveyed thereto via at the least one injection conduit 44 and the at least one slurry conduit 52, respectively. The fuel and oxygen are processed in the gasification plant 16 and produce syngas which is utilized by the power block 18 to produce electrical power.

Figure 3:
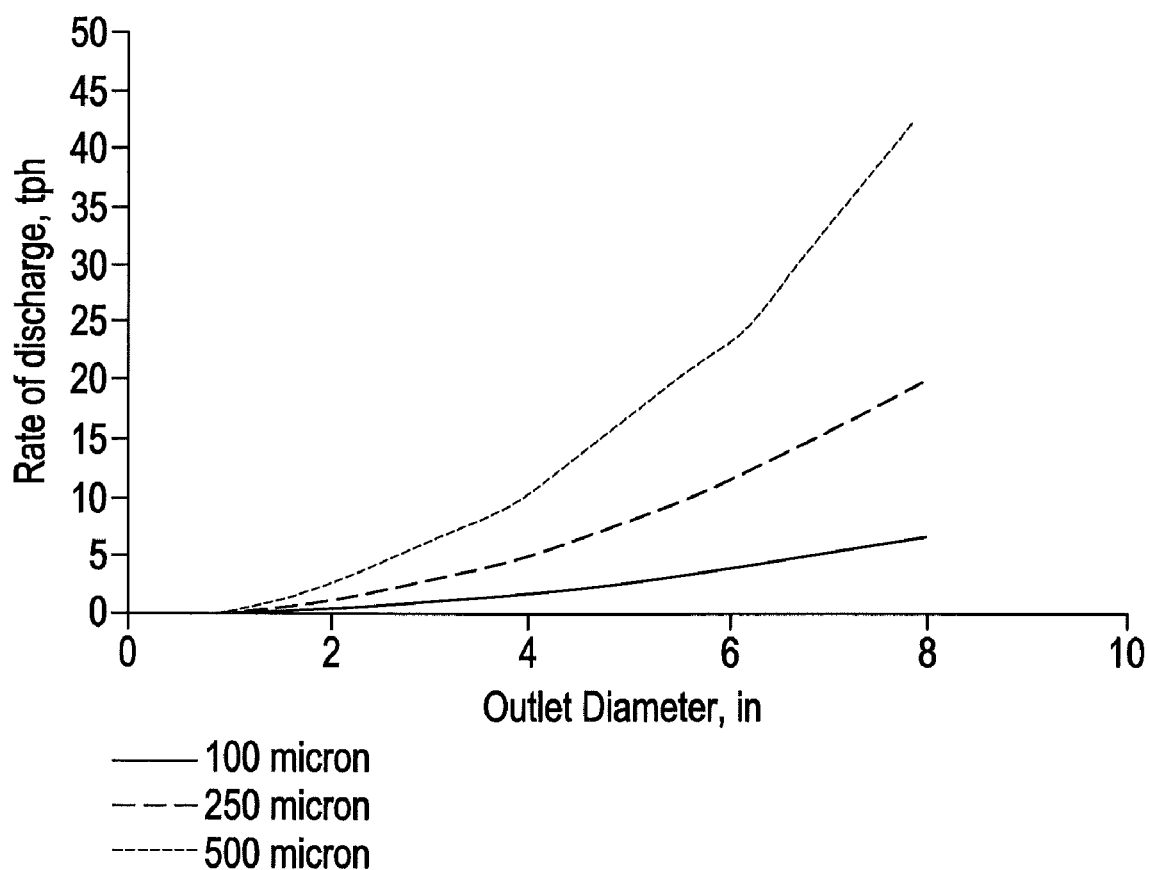
FIG. 3 is a graph illustrating flow rates of various particle sizes through a conical hopper.

Separating the fines from the solids in the cyclone 34 and removing the fines to the baghouse 46 to be handled separately from the solids has several advantages over processing the solids and fines together. For example, separation of the fines from the solids increases the flow rate possible through the storage hopper 40, the one or more solids pumps 42, and/or other components. The graph of FIG. 3 illustrates flow rates of particles of various sizes through a conical hopper such as the storage hopper 40. The flow rates are shown as a function of an outlet diameter of the hopper. By way of example, and as shown in FIG. 3, particles 500 microns in diameter move through a hopper with an outlet diameter of 6 inches at about 25 tons/hour, while particles of 100 microns in diameter flow through the same hopper at under 5 tons/hour. Thus by removing fines, for instance, of 100 microns in diameter or smaller from the flow through the storage hopper 40 and/or solids pumps 42, an overall higher flow rate therethrough can be achieved for a given equipment size. Thus, by removing the fines, smaller equipment sizes may be used to achieve a desired flow rate which reduces capital expenditures.

Further, to reliably store and process fines with solids in a single stream, an amount of drying of the stream increases significantly. A given stream of fines has a greater overall surface area than a similar stream of solids, thus a greater amount of surface moisture can be carried therein. Greater surface moisture increases the likelihood of solids handling problems such as plugging, arching and ratholing in equipment such as cyclones 34, storage hoppers 40 and baghouses 46. Reducing an overall surface moisture to a desired level, therefore, requires more drying of the stream. Separating the fines from the solids for processing also reduces pyrophroicity, or unintended combustion of the stream in a location outside of the gasifier. Smaller particle sizes increase this concern, especially when the stream is conveyed by, in some embodiments, a heated gas. So, separation of the fines into the slurry feed stream 22 reduces the unintended combustion concerns. Further, removal of the fines from the high pressure solids feed stream 20 decreases the likelihood of effluent emissions and solids handling problems such as plugging, arching and ratholing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel feed system for a gasifier comprising:
a grinding mechanism capable of grinding a feedstock into particles of desired particle sizes, the particle sizes including solids particles larger than a first threshold size and fines particles smaller than a second threshold size;
at least one solids separation device in flow communication with the grinding mechanism and capable of separating the solids particles from the fines particles;
at least one solids conduit for conveying the solids particles to a gasification plant; and
at least one fines stream for conveying the fines particles to the gasification plant, the fines stream including a slurry stream having at least one slurry tank in flow communication with the at least one solids separation device wherein the fines are added to a slurry.

2. The feed system of claim 1 wherein the slurry stream further comprises:
at least one slurry conduit in flow communication with the at least one slurry tank for conveying the slurry to the gasification plant.

3. The feed system of claim 1 wherein the solids separation device comprises a cyclone.

4. The feed system of claim 1 including a drying mechanism in operable communication with the grinding mechanism and capable of removing moisture from the solids particles and the fines particles.

5. The feed system of claim 4 wherein the drying mechanism is disposed in the grinding mechanism.

6. The feed system of claim 1 including a ground solids storage hopper disposed between the at least one solids separation device and the gasification plant.

7. The feed system of claim 1 including a storage device disposed between the at least one solids separation device and the at least one slurry tank.

8. The feed system of claim 7 wherein the storage device is a baghouse.

9. The feed system of claim 1 including at least one pressurization device disposed between the at least one solids separation device and the gasification plant for urging the solids particles toward the gasification plant.

10. The feed system of claim 9 wherein the at least one pressurization device is at least one solids pump.

11. A method for feeding stock into a gasifier comprising:
conveying a feedstock into a grinding mechanism;
grinding the feedstock into particles of desired sizes in the grinding mechanism;
separating solids particles larger than a first threshold size from fines particles smaller than a second threshold size;
conveying the solids particles toward a gasification plant; and
conveying the fines particles toward the gasification plant by:
conveying the fines particles toward a slurry tank;
mixing the fines particles with one or more additives to produce a slurry mixture; and
conveying the slurry mixture toward the gasification plant.

12. The method of claim 11 comprising removing moisture from the solids particles and/or the fines particles in the grinding mechanism.

13. The method of claim 12 wherein removing is accomplished by forcing hot gas across the solids particles and/or the fines particles.

14. The method of claim 11 wherein separating the solids particles from the fines particles comprises:
conveying the solids particles and the fines particles to a particle separation device; and
separating the solids particles from the fines particles via the particle separation device.

15. The method of claim 14 wherein the particle separation device comprises a cyclone.

16. The method of claim 11 wherein the second threshold size is a particle diameter of about 100 microns.

17. The method of claim 11 wherein the solids particles are conveyed to the gasification chamber via one or more solids pumps.

18. The method of claim 11 including storing the fines particles in a baghouse until conveyed to the slurry tank.

19. The method of claim 11 wherein the additives include particles recycled from the gasification chamber.

* * * * *